(12) United States Patent
Aubertine

(10) Patent No.: US 7,055,144 B2
(45) Date of Patent: May 30, 2006

(54) METHOD AND SYSTEM FOR OPTIMIZING THE USE OF PROCESSORS WHEN COMPILING A PROGRAM

(75) Inventor: Matthew Edward Aubertine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 09/903,937

(22) Filed: Jul. 12, 2001

(65) Prior Publication Data

US 2003/0014739 A1    Jan. 16, 2003

(51) Int. Cl.
*G06F 9/45* (2006.01)

(52) U.S. Cl. ............... 717/149; 717/151; 717/154; 717/161

(58) Field of Classification Search ........ 717/136–167; 718/106
See application file for complete search history.

(56) References Cited

U.S. PATENT DOCUMENTS

| | | | | |
|---|---|---|---|---|
| 5,109,512 | A * | 4/1992 | Bahr et al. | 718/103 |
| 5,179,702 | A * | 1/1993 | Spix et al. | 718/102 |
| 5,333,246 | A * | 7/1994 | Nagasaka | 345/619 |
| 5,535,393 | A * | 7/1996 | Reeve et al. | 717/149 |
| 5,999,734 | A * | 12/1999 | Willis et al. | 717/149 |
| 6,199,093 | B1 * | 3/2001 | Yokoya | 718/102 |
| 6,374,403 | B1 * | 4/2002 | Darte et al. | 717/161 |
| 6,507,947 | B1 * | 1/2003 | Schreiber et al. | 717/160 |
| 6,647,408 | B1 * | 11/2003 | Ricart et al. | 718/105 |
| 6,681,388 | B1 * | 1/2004 | Sato et al. | 717/159 |
| 2002/0083423 | A1 * | 6/2002 | Ostanevich et al. | 717/149 |

FOREIGN PATENT DOCUMENTS

EP    1031923 A2 *   8/2000

OTHER PUBLICATIONS

Gross, et al., "Parallel Compilation for a Parallel Machine", 1989, ACM 0-89791-306-X/89/0006/0091, pp. 91-100.*

* cited by examiner

*Primary Examiner*—Tuan Dam
*Assistant Examiner*—Andre R Fowlkes
(74) *Attorney, Agent, or Firm*—Sawyer Law Group LLP

(57) ABSTRACT

A method and system for optimizing the use of a plurality of processors when compiling a program in a computer system is disclosed. The method and system comprises providing a list of directories and a list of processors. The method and system further includes determining when a directory is available. The method and system includes assigning a directory to a next available processor in an ordered manner to allow the next available processor to compile at least one file within the directory. Finally, the method and system includes ensuring that the maximum number of directories can be processed by assigning a processor thereto. Through the use of the method and system in accordance with the present invention, compile cycle time for large programs is significantly reduced. Accordingly, the dependencies are updated simultaneously with the code changes, thereby allowing for the compiling of the large program with minimal dependency violations.

18 Claims, 10 Drawing Sheets

METHOD AND SYSTEM FOR OPTIMIZING THE USE OF PROCESSORS WHEN COMPILING A PROGRAM

FIELD OF THE INVENTION

The present invention relates to scheduling the compiling of files of a complex program within directories and in particular to a method and system for optimizing the use of processors when compiling a complex program.

BACKGROUND OF THE INVENTION

FIG. 1 is a block diagram of a computer system 100 for implementing a complex program. The computer system 100 includes an operating system 102 which controls a plurality of processors 104a–104d. The processors 104a–104d are utilized to compile the program 106. The program could be, for example, an operating system such as an AIX operating system.

Typically, a first version of a complex program such as an operating system has errors therewith. In addition, during the development of the program new features are added. During the process, typically several changes may be made in the source code related to the complex program.

One way to implement the complex program is to have a single large directory that contains the entire program. However, if a single large directory were utilized to hold data it would require a significant amount of time to make source code changes in the program. The reason why source code changes would take a significant amount of time is that every time a source code change was made in the program, the entire program, no matter where the source code change was made, would have to be accessed up to that source code change. Attempting to manage revisions in this manner would require a significant amount of time.

To more efficiently compile the complex program from version to version in the development process, the program is broken up into a directory structure where discrete files of the code are placed in specific directories or subdirectories. Within each directory are files related to that particular file of the code.

The program is broken up into directories or subdirectories to allow for different entities to be responsible for different files of the code. The files within the directories that are used in compiling the program can be maintained individually in a program library and accessed as desired. The dependencies of the directories preferably conform to the compile environment conventions of the Open Software Foundation (OSF) Development Environment.

One way of compiling the code files within each of the directories is to use a MAKE facility. The MAKE facility creates a plurality of make files. In an OSF environment, each make file provides the data that is needed to compile the code files within a particular directory and includes the directory's dependencies on other directories. Breaking the complex program up into code files based upon the directory structure allows for quick access to source code changes and also quick identification of those changes. Typically, the code files within one directory can have a dependency on the code file in one or more other directories. That is, the code files of one directory have to be compiled before the code files of one or more other directories.

In compiling the complex program 106, the change in code within each of the directories is accessed by a processor 104a–104d and scheduled by a scheduler (not shown) for compilation prior to integration into an executable program.

For successful compilation of the complex program 106, the code files within each of the directories required must be scheduled for compilation in the correct sequence. Furthermore, logically independent directories must be scheduled for compilation before their dependent directories can be compiled.

Scheduling the compilation of directories when there are no dependencies between the directories is relatively simple. However, the scheduling becomes complex when there are compilation dependencies between directories. As before mentioned, different entities are typically responsible for a particular portion of the program. The scheduling is complex because each of the directories is maintained independently of each other on an ongoing basis by the entity that is responsible for a particular directory. This may result in a modification to a particular directory, which introduces dependencies on other directories that are unknown to the scheduler.

Accordingly, if a directory that is dependent upon another directory is compiled before that directory, a deadlock occurs. The deadlock can result in a significant delay in compile cycle time. The delay can significantly negatively impact the development process of each program.

Accordingly, what is needed is a system and method for reducing the compile cycle time of a complex program. The solution should be simple, cost effective and capable of being easily adapted to current technology. The present invention addresses such a need.

SUMMARY OF THE INVENTION

A method and system for optimizing the use of a plurality of processors when compiling a program in a computer system is disclosed. The method and system comprises providing a list of directories and a list of processors. The method and system further includes determining when a directory is available. The method and system includes assigning a directory to a next available processor in an ordered manner to allow the next available processor to compile at least one file within the directory. Finally, the method and system includes ensuring that the maximum number of directories can be processed by assigning a processor thereto.

Through the use of the method and system in accordance with the present invention, compile cycle time for large programs is significantly reduced. Accordingly, the dependencies are updated simultaneously with the code changes, thereby allowing for the compiling of the large program with minimal dependency violations.

DETAILED DESCRIPTION

The present invention relates to a method and system for optimizing the use of processors when compiling a complex program. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is disclosed in the context of a preferred embodiment. The preferred embodiment of the present invention provides for a method and system for allowing a computer system to utilize a scheduler to optimize the use of the plurality of processors when compiling a complex program such as an AIX operating system. The primary advantage of the utilization of the method and system in accordance with the present invention is that long compile cycle times due to large compile tree structures are reduced because there are no compile delays due to idle processors. A second advantage is that since the dependencies are updated substantially simultaneously with code changes, there are minimal dependency violations and therefore few deadlocks.

Figure 1:
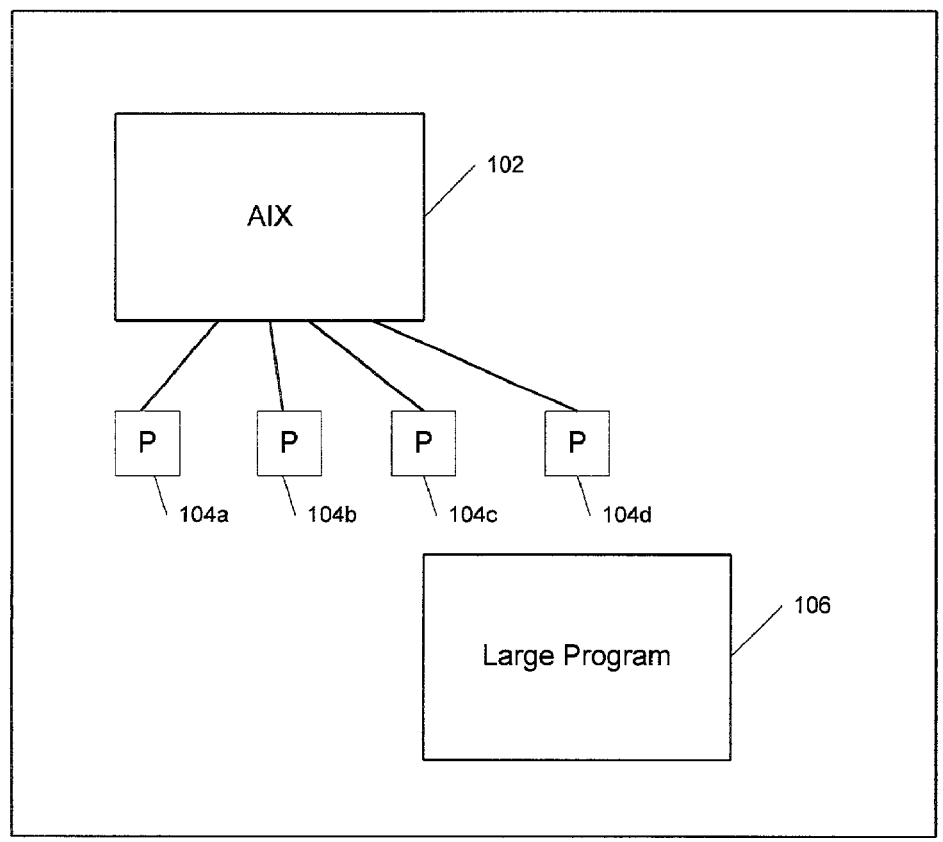
FIG. 1 illustrates a conventional computer system.
Figure 2:
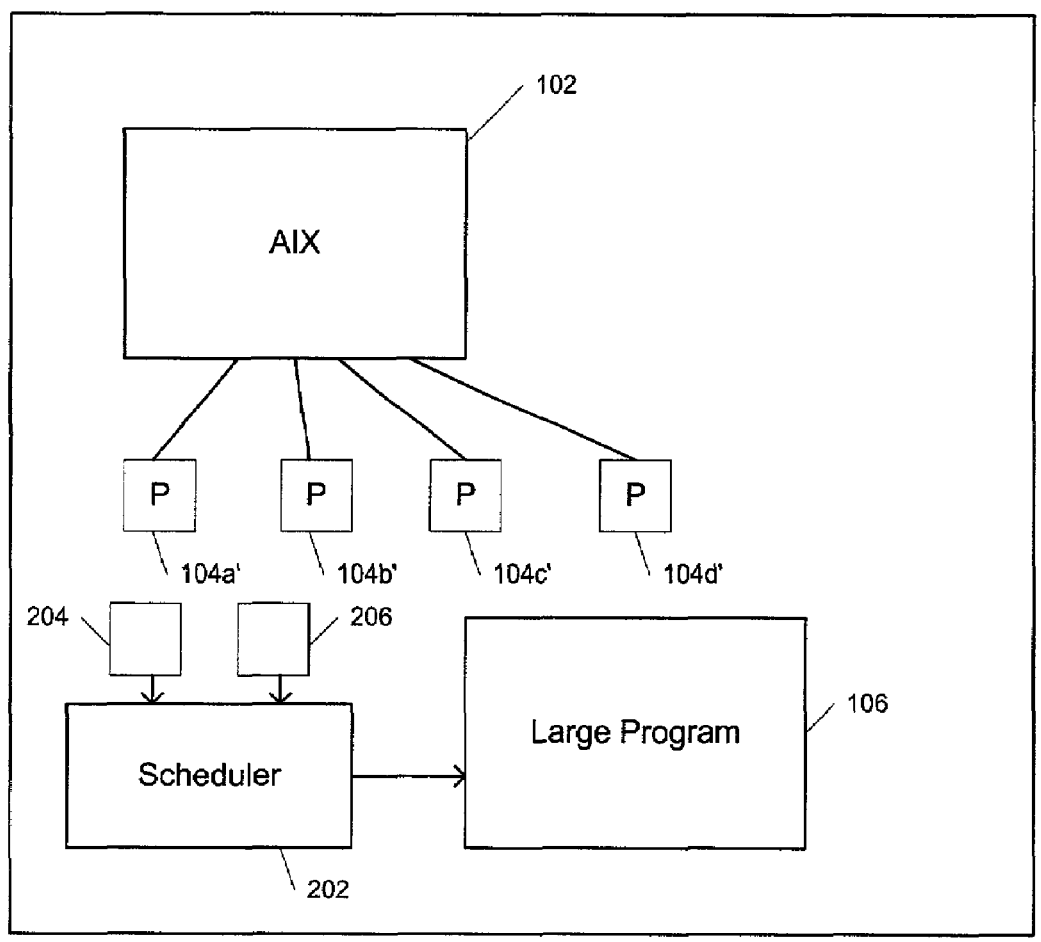
FIG. 2 illustrates a computer system in accordance with the present invention.

Referring now to FIG. 2, what is shown is a computer system 200 in accordance with the present invention. The system includes similar elements to those shown in FIG. 1. In addition, the system 200 includes a scheduler 202 which provides for the optimization of the use of the processors 104a'–104d' when compiling the complex program 106, a master array 204 which indicates the dependencies of the directories processor, and an array 206 which lists the processors 104a–104d.

In a preferred embodiment of the present invention, the scheduler 202 receives a list of directories of code files to be compiled from the master array 204 and also receives a list of processors available from a processor array 206. The directories are in a tree structure that allows for a determination of the dependencies of directories. The scheduler 202 ensures that each of the available processors is assigned to an available directory (i.e., no processor is idle when the code files of a directory are available to be compiled). The list of directories is read by the scheduler 202 and upon finding one that has its dependencies satisfied (i.e., all directories which had to be processed first have been processed), the scheduler 202 then searches for an available processor. The scheduler 202 then reads the list of processors until it finds one that is available and assigns the directory to the processor. Also, as the processor list is being read, the scheduler looks for processors that have completed their work and updates the processor list and the directory list.

Figure 3:
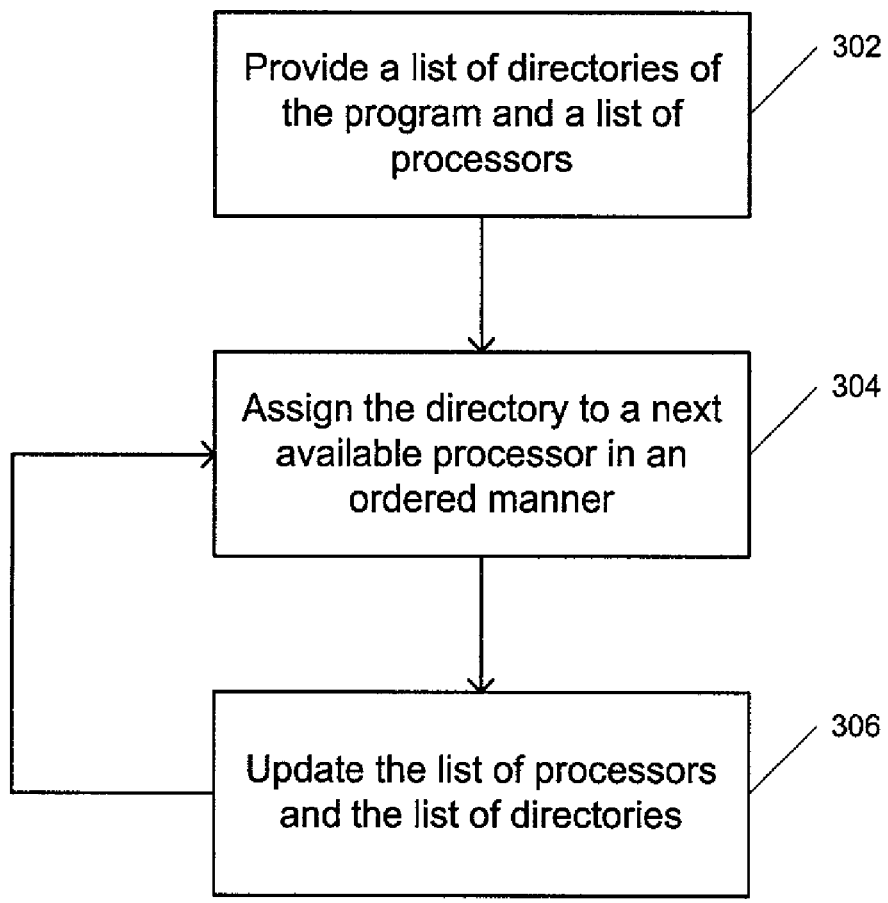
FIG. 3 is a flowchart of the operation of the method in accordance with the present invention.

For a better understanding of the operation of the preferred embodiment of the method in accordance with the present invention, please refer to FIG. 3. FIG. 3 is a flowchart of the operation of the method in accordance with the present invention. First, a list of directories of the program and a list of processors are provided, via step 302. Thereafter, a directory is assigned to the next available processor in an ordered manner to compile the code files within the directory, via step 304.

Figure 3A:
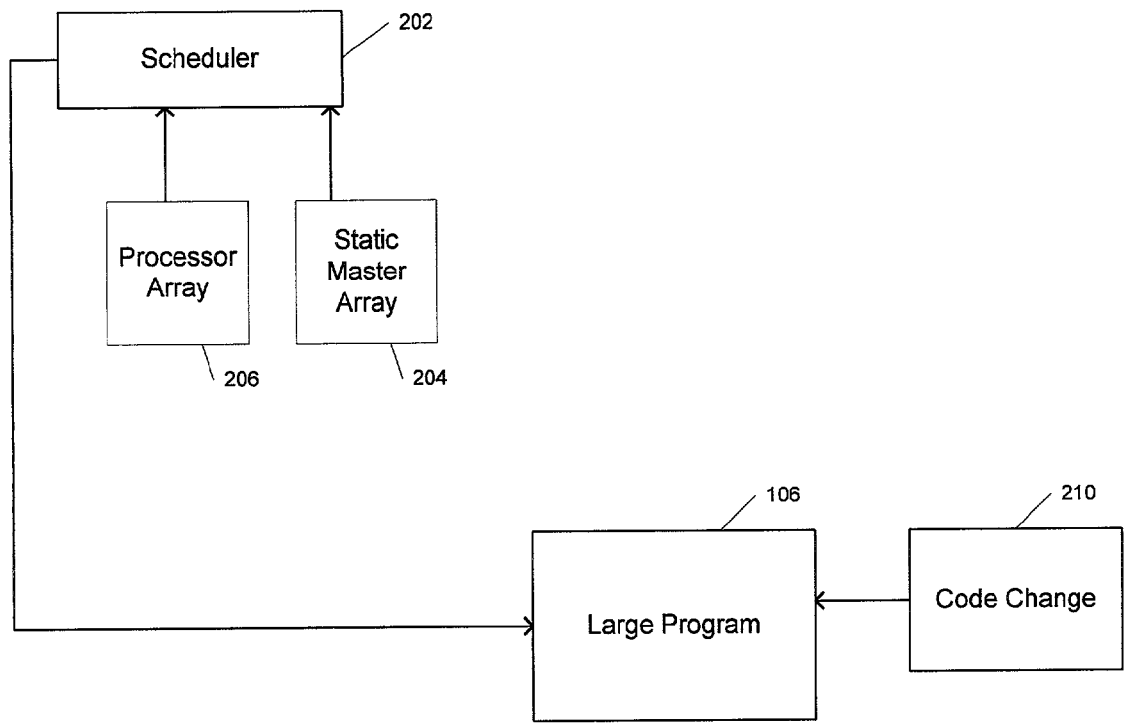
FIG. 3A is a diagram illustrating the use of the static master array when updating the program.

In a typical scenario, the ordered manner for assigning the directories is performed (step 304) utilizing a static master array 204'. Accordingly, FIG. 3A is a diagram illustrating the use of the static master array 204' when updating the program 106. The static master array 204' provides a static list of dependencies of the directory to the scheduler 202, and the processor array 206 provides the list of processors. When there is a code update 210' to the large program 106, these changes are provided to the large program by the persons responsible for the directories. The scheduler 202 schedules the processors 104a–104d to compile the updated large program 106 based upon the code changes.

The static master array 204' provides the order in which the processors are to compile the code files associated with each of the directories based upon the dependencies of the directories. The ordering of the directories allows for compiling of the code files of some directories in parallel. For example, assume there are three directories A, B and C. Directory A is not dependent on any directory. On the other hand, directories B and C have no dependencies on each other but both are dependent upon directory A. Therefore, directories B and C can be compiled in parallel after directory A has been compiled.

In so doing, the compiling of the program can be accomplished more quickly. In large programs this "parallelization" of the compiling of the code files of the directories can have significant impact. For example, compiling the service code for an AIX operating system without parallelization may require up to 3 days, whereas with parallelization the compiling of the operating system could be accomplished in 1 ½ days.

Accordingly, in this system, the complex program is periodically updated via changes to the code files in each of the directories. However, if the dependencies of the directories also change, the program will break at the point the dependencies are not satisfied. Accordingly, a deadlock can result therefrom which will increase the overall time to compile the program. If a deadlock occurs, the increase in compile time can be significant. For example, the compile time can increase from 1 ½ days to a week if several deadlock conditions occur. Accordingly, a system and method in accordance with the present invention minimizes the number of deadlocks. For a further explanation of the features of the present invention, refer now to the following discussion in conjunction with the accompanying figures.

In a system and method in accordance with the present invention, at the same time the code changes are utilized to provide an updated large program, dependency changes are also provided to the master array to provide an updated master array. In so doing, the updated program can be compiled while minimizing the deadlocks.

Figure 4:
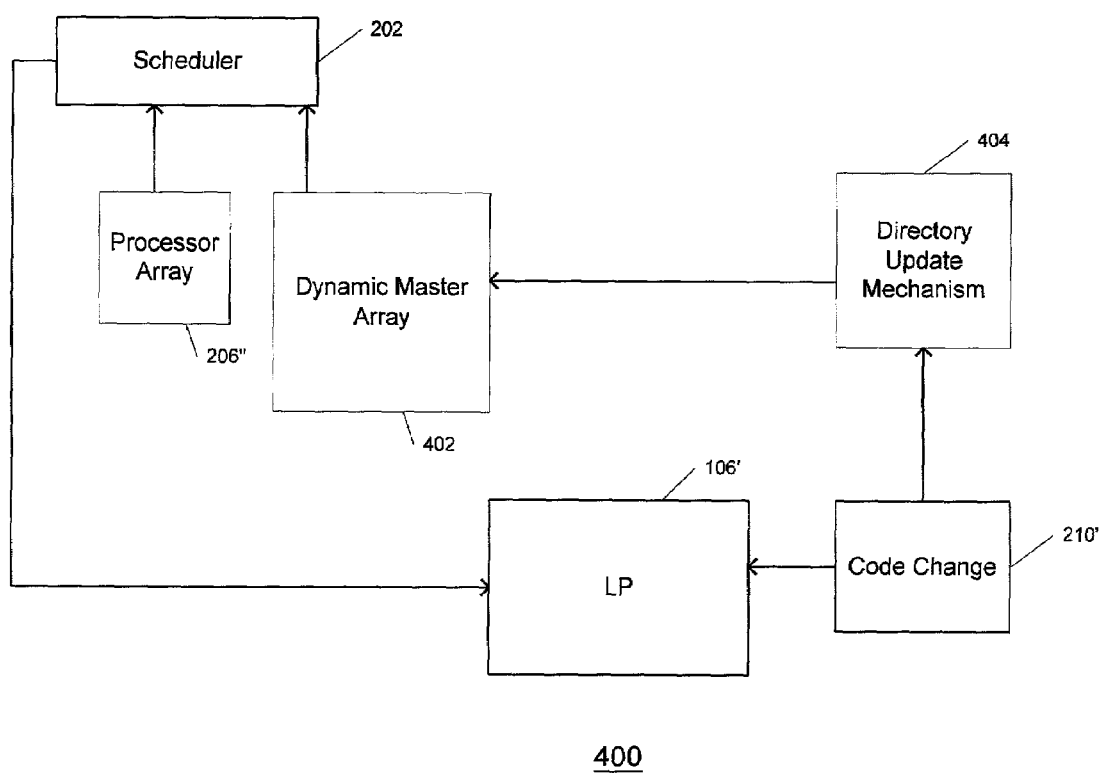
FIG. 4 illustrates a dynamic master array structure in accordance with the present invention.

For a more detailed description of the features of the present invention, refer now to the following discussion in conjunction with the accompanying figures. FIG. 4 illustrates a dynamic master array structure 400 in accordance with the present invention. The system includes similar elements to those shown in FIG. 3A. In addition, the system 402 includes a directory update mechanism 404 for providing dependency changes to the master array 402.

Figure 5:
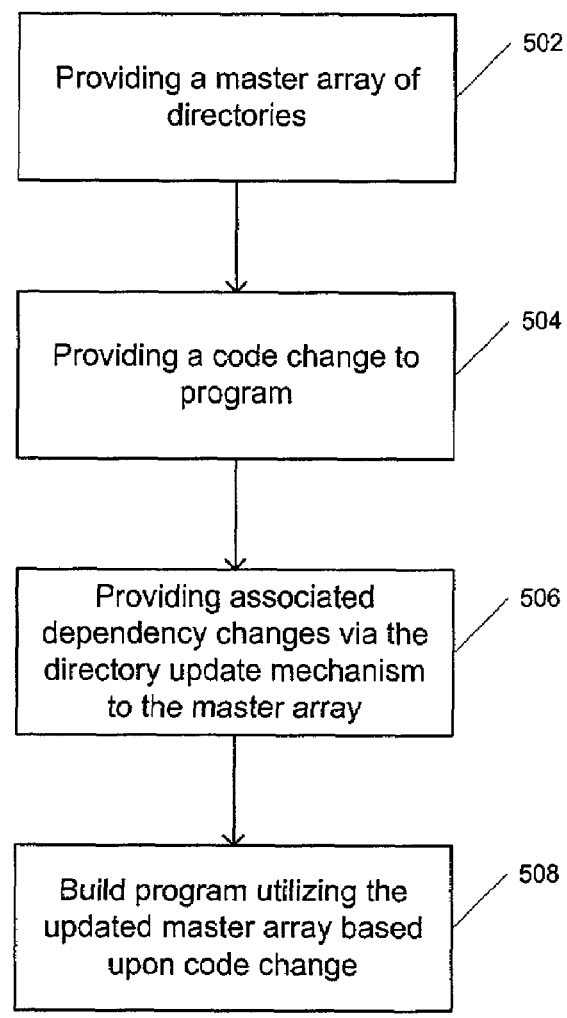
FIG. 5 is a flow chart for minimizing the cycle time when building a program in accordance with the present invention.

For a better understanding of the method in accordance with the present invention, please refer now to FIG. 5. FIG. 5 is a flow chart for updating a program in accordance with the present invention. Initially, a master array of directories is provided, wherein the master array is a list of the dependencies of the directories, via step 502.

Next, a code change 210' is provided to the large program 106 to provide an updated program, via step 504, and dependency changes are also provided via the directory update mechanism, via step 506, to provide an updated master array 402, via step 508. The directory update mechanism performs one of two tasks. It either adds a dependency change or replaces a dependency change in the master array. The dependency changes can include both new dependencies changes, which are related to new directories, as well as changes in dependencies to existing directories. For a more detailed description of the directory update, refer now to the following discussion in conjunction with the accompanying figures.

The merging of the dependency changes array and the master array minimizes deadlocks when compiling the program. For a description of a preferred embodiment of this merging of the two arrays, refer now to the following.

Figure 5A:
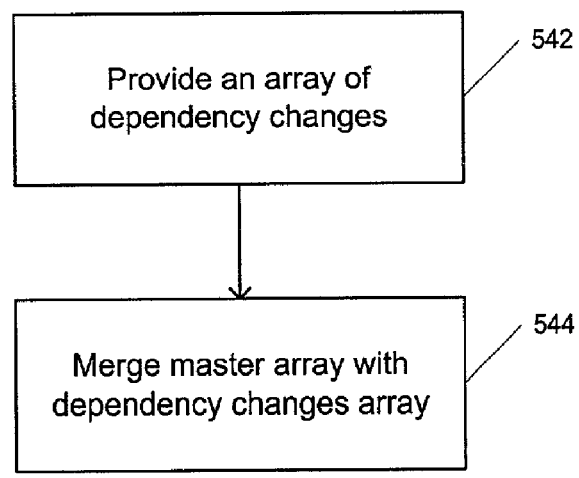
FIG. 5a illustrates a directory update mechanism in accordance with the present invention.

FIG. 5A is a flow chart of a directory update mechanism in accordance with the present invention. First, an array of dependency changes is constructed, via step 542. Next, the dependency changes array and master array are merged to create an updated master array, via step 544.

Figure 5B:
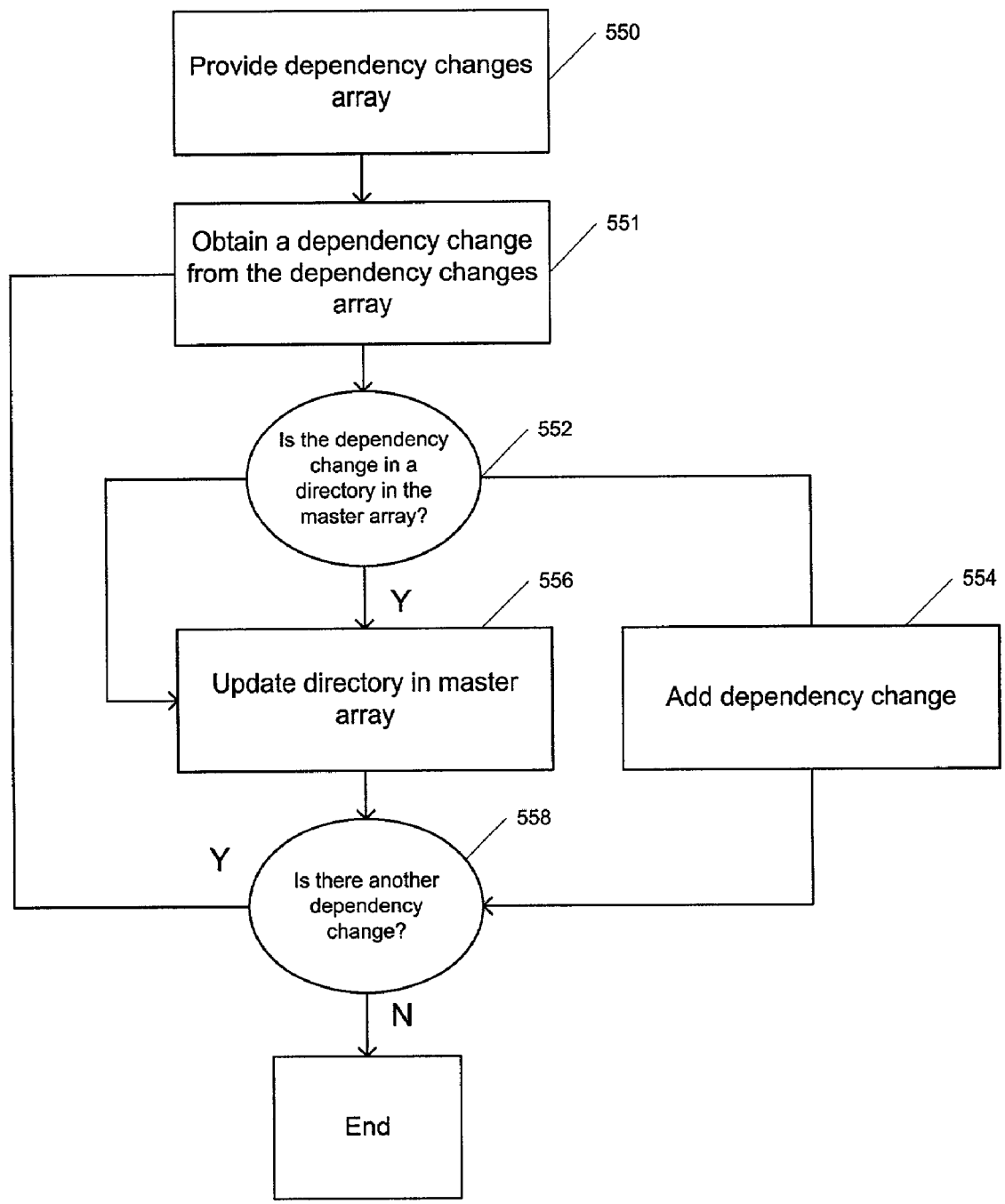
FIG. 5B illustrates a method for merging the dependency change array with master array.

FIG. 5B is a flow chart of merging the dependency changes array with master array. First, the dependency changes array is provided, via step 550. Then a dependency change is obtained from the array, via step 551. Next, it is determined if the dependency change is in a directory in the master array, via step 552. If the dependency change is not found, meaning that this is a new directory entry, then the dependency change is added to a new directory in the master array, via step 554. Thereafter, it is determined if there is another dependency change, via step 558. If there are no more dependency changes, then end. If there are more dependency changes, then return to step 551. If, on the other hand, the dependency change is found via step 552, meaning that this is a dependency change within an existing directory, then the dependency change in the master array is updated, via step 556. Then proceed to step 552 to determine if there are any more dependency changes.

Referring back to FIG. 5, the updated program 106 is then compiled through the use of the updated master array 402, via step 506. In a preferred embodiment, a scheduler 202 would receive the updated list of dependencies from the master array 402 and a list of processors from a processor array 206 to compile the program.

Referring back to FIG. 3, after a directory is assigned to a processor in an ordered manner (step 304), the list of processors and the list of directories are then updated, via step 306. Finally, steps 304 and 306 are repeated to ensure that code files of the maximum number of directories are being compiled. Accordingly, utilizing a system and method in accordance with the present invention, processors 104a'–104d' (FIG. 2) are continuously compiling the code files of the available directories to provide the complex program.

Although the preferred embodiment of the present invention is described as being utilized in accordance with the OSF Development Environment, one of ordinary skill in the art will readily recognize that a variety of operational environments could be implemented while remaining within the spirit and scope of the present invention.

Through the use of the method and system in accordance with the present invention, compile cycle time for large programs is significantly reduced. Accordingly, the dependencies are updated substantially simultaneously with the code changes, thereby allowing for the compiling of the large program with minimal dependency violations.

Figure 6:
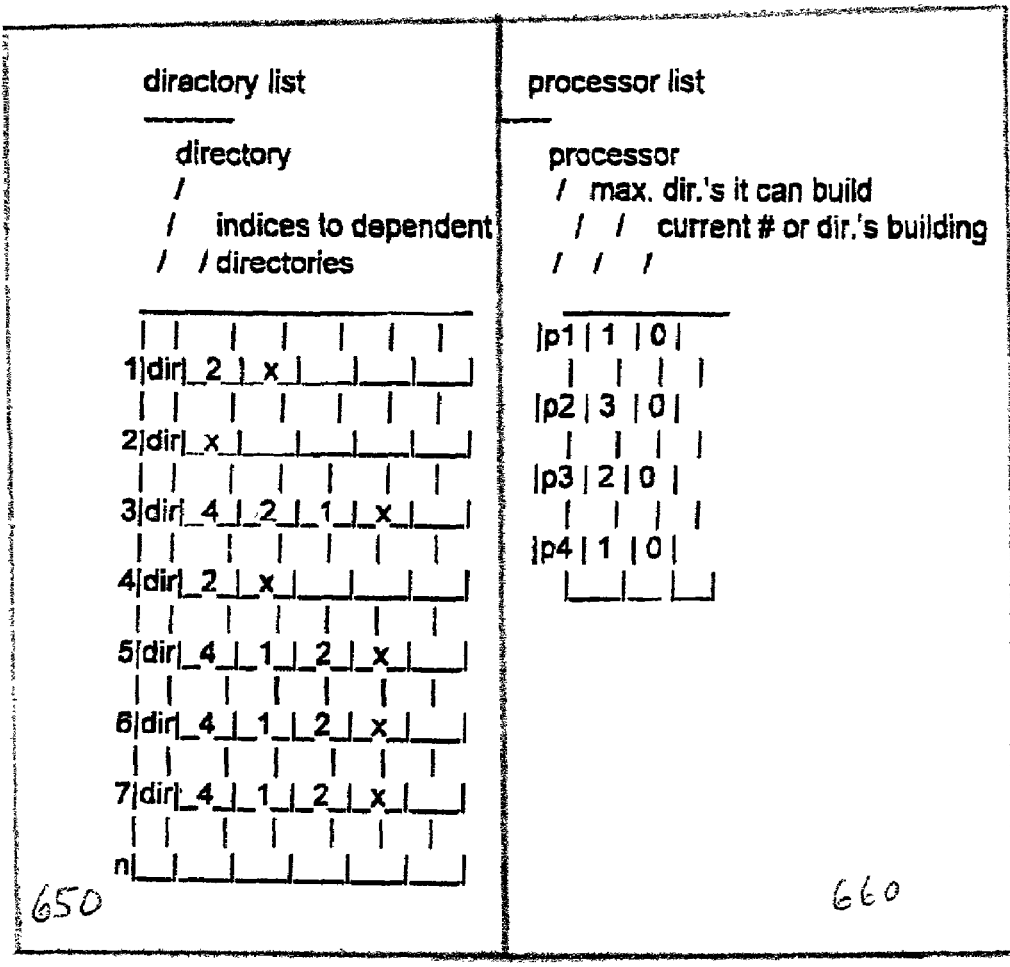
FIG. 6 is an illustration of a directory list and a processor list.
Figure 7:
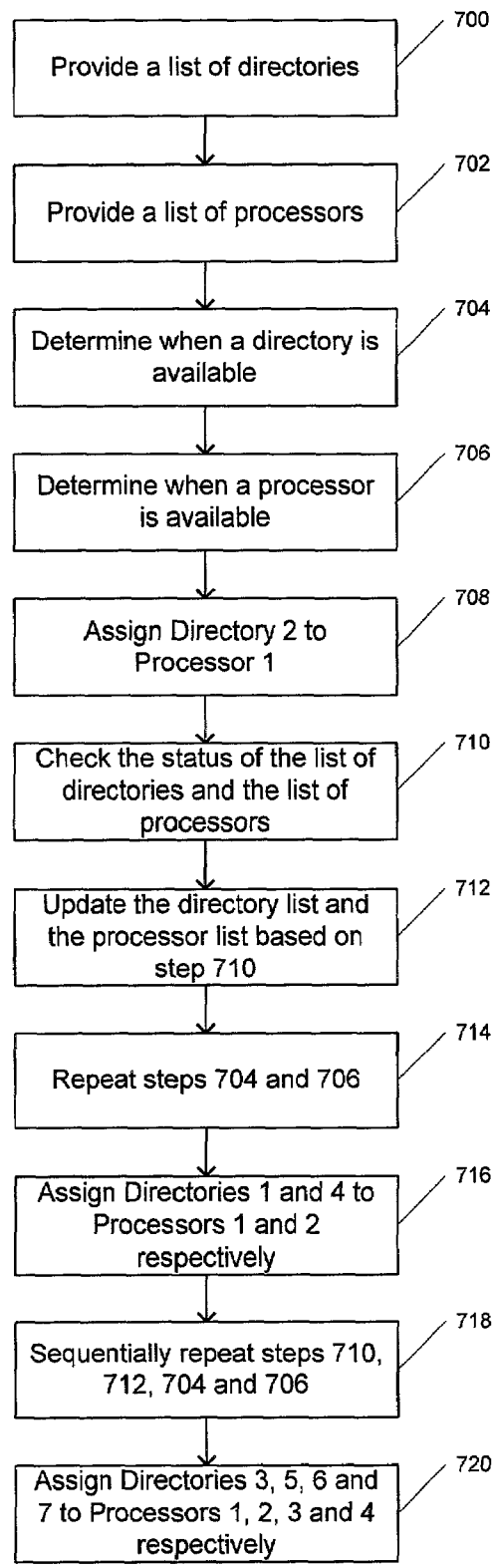
FIG. 7 is a flowchart of an example of the operation of the preferred embodiment of the method in accordance with the present invention.

For an example of the operation of the preferred embodiment of the method in accordance with the present invention, please refer to FIG. 6 and FIG. 7. FIG. 6 is an illustration of a directory list 650 and a processor list 660, shown as a two-dimensional array 640 within the operating system. FIG. 7 is a flowchart of an example of the operation of the preferred embodiment of the method in accordance with the present invention. Referring back to FIG. 6, the directory list 650 includes the dependencies associated with each respective directory. For example, the code files of Directory 1 are dependent on the code files of Directory 2, Directory 2 has no dependencies, the code files of Directory 3 are dependent on Directory 4, Directory 2, and Directory 1, etc.

Please refer now to FIG. 7. The method begins by first providing the directory list 650, via step 710. Next, the processor list 660 is provided, via step 702. A determination is then made as to when a directory is available, via step 704. Next, a determination is made as to when a processor is available in an ordered manner, via step 706. Note that Directory 2 has no dependencies. Accordingly, Directory 2 is assigned to processor 104a' (FIG. 2), via step 708. Once processor 104a' has completed the compiling of the code files of Directory 2, processor 104a' is free.

Next, the status of the directory list 650 and the processor list 660 is checked, via step 710. The directory list 650 and the processor list 660 are then updated, based on step 712. Next, steps 704 and 706 are repeated, via step 714. The code files of Directories 1 and 4 are ready to be compiled so they are assigned to processor 104a' and processor 104b' respectively, via step 716. Next, steps 710, 712, 704 and 706 are sequentially repeated, via step 718. The remaining directories have dependencies on Directory 1 and Directory 4. Accordingly, once processor 104a' and processor 104b' have completed compiling the code files of Directories 1 and 4 respectively, the code files of Directories 3, 5, 6 and 7 are respectively assigned to processors 104a–104d, via step 720.

Through the use of the method and system in accordance with the present invention, two distinct advantages are realized. The primary advantage is that long compile cycle times due to large compile tree structures are reduced because there are no compile delays due to idle processors. A second advantage is that since the dependencies are updated substantially simultaneously with the code changes, there are minimal dependency violations and therefore few deadlocks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for optimizing the use of a plurality of processors when compiling a program in a computer system, the method comprising the steps of:
   (a) locating a list of directories of the program and a list of processors of the computer system;
   (b) assigning a next directory to a next available processor in an ordered manner to allow the next available processor to compile at least one file within the directory;

(c) compiling by the next available processor the at least one file within the next directory; and (d) repeating step (b) and (c) until there are no more directories to be compiled.

2. The method of claim 1 wherein the assigning step (b) further includes the step of (b1) obtaining a directory in which all dependencies have been satisfied.

3. The method of claim 1 wherein the assigning step (b) further includes the step of (b1), updating the list of processors and the list of directories based upon the assignment of the directory.

4. The method of claim 1 wherein the assigning step (b) further includes the step of (b1) providing a directory update mechanism for assigning the directories in the ordered manner.

5. The method of claim 4 wherein the providing an update mechanism step (b1) further comprises the steps of:

(b11) providing an array of dependency changes; and (b12) merging the dependency changes array with a master array of changes.

6. The method of claim 5 wherein the merging step (b12) comprises the steps of:

(b121) obtaining a dependency change from the dependency changes array;

(b122) determining whether the dependency change is in a directory in the master array;

(b123) updating the directory in the master array of the dependency change in a directory of the master array;

(b124) adding dependency change to the master array in a new directory if the dependency change is not in a directory of the master array;

(b125) determining if there is another dependency change in the dependency changes array after either step (b123) or step (b124); and (b126) repeating steps (b121)–(b125) until all dependency changes have been obtained from the dependency change array.

7. A system for optimizing the use of a plurality of processors when compiling a program in a computer system, the system comprising:

means for locating a list of directories in the program and a list of processors of the computer system;

means for assigning a next directory to a next available processor in an ordered manner to allow the next available processor to compile at least one file within the directory;

means for compiling by the next available at least one file within the next directory; and means for ensuring that there are no more directories to be compiled by utilizing the assigning means and the compiling means.

8. The system of claim 7 wherein the assigning means further includes means for obtaining a directory in which all dependencies and prerequisites have been satisfied.

9. The system of claim 7 wherein the assigning means further includes the means for updating the list of processors and the list of directories based upon the assignment of the directory.

10. The system of claim 7 wherein the assigning means further includes the means for providing a directory update mechanism for assigning the directories in the ordered manner.

11. The system of claim 10 wherein the providing an update mechanism means further comprises:

means for providing an array of dependency changes; and means for merging the dependency changes array with a master array of changes.

12. The system of claim 11 wherein the merging means comprises:

means for obtaining a dependency change from the dependency changes array;

means for determining whether the dependency change is in a directory in the master array;

means for updating the directory in the master array of the dependency change in a directory of the master array;

means for adding dependency change to the master array in a new directory if the dependency change is not in a directory of the master array;

means for determining if there is another dependency change in the dependency changes array; and means for ensuring that all dependency changes have been obtained from the dependency change array.

13. A computer readable medium containing program instructions for optimizing the use of a plurality of processors when compiling a program in a computer system, the program instructions for:

(a) locating a list of directories of the program and a list of processors of the computer system;

(b) assigning a next directory to a next available processor in an ordered manner to allow the next available processor to compile at least one file within the directory;

(c) compiling by the next available processor the at least one file within the next directory; and (d) repeating step (b) and (c) until there are no more directories to be compiled.

14. The computer readable medium of claim 13 wherein the assigning step (b) further includes the step of (b1) obtaining a directory in which all dependencies and prerequisites have been satisfied.

15. The computer readable medium of claim 13 wherein the assigning step (b) further includes the step of (b1), updating the list of processors and the list of directories based upon the assignment of the directory.

16. The computer readable medium of claim 13 wherein the assigning step (b) further includes the step of (b1) providing a directory update mechanism for assigning the directories in the ordered manner.

17. The computer readable medium of claim 16 wherein the providing an update mechanism step (b1) further comprises the steps of:

(b11) providing an array of dependency changes; and (b12) merging the dependency changes array with a master array of changes.

18. The computer readable medium of claim 17 wherein the merging step (b12) comprises the steps of:

(b121) obtaining a dependency change from the dependency changes array;

(b122) determining whether the dependency change is in a directory in the master array;

(b123) updating the directory in the master array of the dependency change in a directory of the master array;

(b124) adding dependency change to the master array in a new directory if the dependency change is not in a directory of the master array;

(b125) determining if there is another dependency change in the dependency changes array after either step (b123) or step (b124); and (b126) repeating steps (b121)–(b125) until all dependency changes have been obtained from the dependency change array.

* * * * *